(12) United States Patent
Kim et al.

(10) Patent No.: US 7,826,395 B2
(45) Date of Patent: Nov. 2, 2010

(54) COMMUNICATION SYSTEM USING ZIGBEE AND METHOD OF CONTROLLING THE SAME

(75) Inventors: Hyo-dae Kim, Yongin-si (KR); Jong-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 12/107,194

(22) Filed: Apr. 22, 2008

(65) Prior Publication Data

US 2009/0262665 A1 Oct. 22, 2009

(51) Int. Cl.
H04L 12/28 (2006.01)
(52) U.S. Cl. .................. 370/254; 370/392
(58) Field of Classification Search .......... 370/328, 370/503, 230, 338; 455/7, 41.2
See application file for complete search history.

(56) References Cited

U.S. PATENT DOCUMENTS

| | | | | |
|---|---|---|---|---|
| 7,319,912 B2* | 1/2008 | Park et al. | ............ | 700/116 |
| 7,403,744 B2* | 7/2008 | Bridgelall | ............ | 455/41.2 |
| 7,468,665 B2* | 12/2008 | Grundy | ............ | 340/568.1 |
| 7,522,639 B1* | 4/2009 | Katz | ............ | 370/503 |
| 7,564,786 B2* | 7/2009 | Lim et al. | ............ | 370/230 |
| 2005/0090264 A1* | 4/2005 | Kim | ............ | 455/455 |
| 2006/0072491 A1* | 4/2006 | Simons | ............ | 370/328 |
| 2006/0114866 A1* | 6/2006 | Kim et al. | ............ | 370/338 |
| 2006/0206582 A1* | 9/2006 | Finn | ............ | 709/217 |
| 2007/0174382 A1* | 7/2007 | Chung et al. | ............ | 709/200 |
| 2007/0211681 A1* | 9/2007 | Sun et al. | ............ | 370/338 |
| 2007/0258386 A1* | 11/2007 | Liu et al. | ............ | 370/254 |
| 2007/0276270 A1* | 11/2007 | Tran | ............ | 600/508 |
| 2008/0044006 A1* | 2/2008 | Kitagawa | ............ | 379/433.01 |
| 2008/0056261 A1* | 3/2008 | Osborn et al. | ............ | 370/392 |
| 2008/0068156 A1* | 3/2008 | Shimokawa et al. | ... | 340/539.22 |
| 2008/0274689 A1* | 11/2008 | Kuban | ............ | 455/7 |
| 2008/0291855 A1* | 11/2008 | Bata et al. | ............ | 370/311 |
| 2009/0040952 A1* | 2/2009 | Cover et al. | ............ | 370/310 |
| 2009/0059919 A1* | 3/2009 | Kim et al. | ............ | 370/389 |
| 2009/0122733 A1* | 5/2009 | Ruy et al. | ............ | 370/310 |

* cited by examiner

Primary Examiner—Thong H Vu
(74) Attorney, Agent, or Firm—Sughrue Mion, PLLC

(57) ABSTRACT

Provided are a communication system using ZigBee to coordinate communication terminals, to transmit and receive data via a coordinator, and to perform a binding operation of setting channels and personal area network (PAN) identifications (IDs) of the communication terminals using only a remote controller when forming a ZigBee communication network between a home appliance and a remote controller, and a method of controlling the same. The communication system which forms a communication network between communication terminals, includes: a ZigBee coordinator disposed at one of the communication terminals, coordinating the communication terminals, and transmitting and receiving data; and a ZigBee device disposed at another one of the plurality of communication terminals and forming a ZigBee communication network through communication with the ZigBee coordinator, wherein an inputting unit for setting channels and PAN IDs of the ZigBee coordinator is provided at the communication terminal in which the ZigBee device is disposed.

18 Claims, 3 Drawing Sheets

COMMUNICATION SYSTEM USING ZIGBEE AND METHOD OF CONTROLLING THE SAME

BACKGROUND OF THE INVENTION

1. Field of the Invention

Systems and methods consistent with the present invention relate to ZigBee communication, and more particularly, to a communication system using ZigBee in order to coordinate communication terminals, to transmit and receive data via a coordinator, and to set channels and personal area network (PAN) identifications (IDs) of the communication terminals using a ZigBee wireless communication network, and a method of controlling the same.

2. Description of the Related Art

Appliances that are generally used in a home, such as an air conditioning system, a television (TV), etc., may be configured to operate by a remote controller for a user's convenience. To this end, home appliances and remote controllers constitute a communication network for mutual wireless communication.

In order to form such a wireless communication network, recently, a communication technology using ZigBee in which power consumption is small and installation costs are low has been widely used.

ZigBee is a low-rate wireless personal area network (LR-WPAN) based on the IEEE 802.15.4 standard. The technology is intended to be used for applications requiring a lower data rate, as compared to Bluetooth technology. However, ZigBee is a wireless communication technology suitable for a home network, which is a low-power specification to use one battery for one year and software and related components are minimized so that the implementation cost is approximately half that of Bluetooth.

A binding procedure for setting the same channel and an ID of a PAN between a home appliance and a remote controller is needed to form a communication network using ZigBee. Conventionally, a binding method using program download, an automatic binding method performed by communicating according to defined rules, and a manual binding method performed externally by using dip switches installed in the home appliance and the remote controller have been used.

However, in the binding method using program download, the environment of an actual field is not reflected and program setting must be changed whenever downloading is performed. In the method using external dip switches, a user must approach a home appliance (for example, a device installed in the ceiling in the case of an air conditioning system) to change program settings. In the method performed by communicating according to defined rules, when another communication network is formed near a current communication network, there is an overlapping of a network with an undesired network.

SUMMARY OF THE INVENTION

The present invention provides a communication system using ZigBee to easily perform a binding operation of setting channels and PAN IDs by using only a remote controller when forming a ZigBee communication network between a home appliance and a remote controller, and a method of controlling the same.

According to an aspect of the present invention, there is provided a communication system which forms a communication network between a plurality of communication terminals, the system including: a ZigBee coordinator disposed at one of the plurality of communication terminals, coordinating the communication terminals, and transmitting and receiving data; and a ZigBee device disposed at another one of the plurality of communication terminals and forming a ZigBee communication network through communication with the ZigBee coordinator, wherein an inputting unit for setting channels and PAN IDs of the ZigBee coordinator is provided at the communication terminal in which the ZigBee device is disposed.

One of the plurality of communication terminals may be a home appliance, and the other one thereof may be a remote controller.

An installation module processing IEEE 802.15.4 data having a different format from a ZigBee format may be provided at the remote controller.

According to another aspect of the present invention, there is provided a method of controlling a communication system which forms a communication network between a plurality of communication terminals, the method including: requesting an IEEE address in a format of ZigBee data or in a different format from the format of ZigBee data through an installation module disposed at one of the plurality of communication terminals; setting an IEEE address of a ZigBee coordinator disposed at another one of the plurality of communication terminals in response to the IEEE address request; transmitting a channel and PAN ID set message through the set IEEE address; and setting a channel and a PAN ID of a ZigBee device in response to the transmitted channel and PAN ID set message.

According to another aspect of the present invention, there is provided a computer readable recording medium in which a program for executing the method is recorded.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
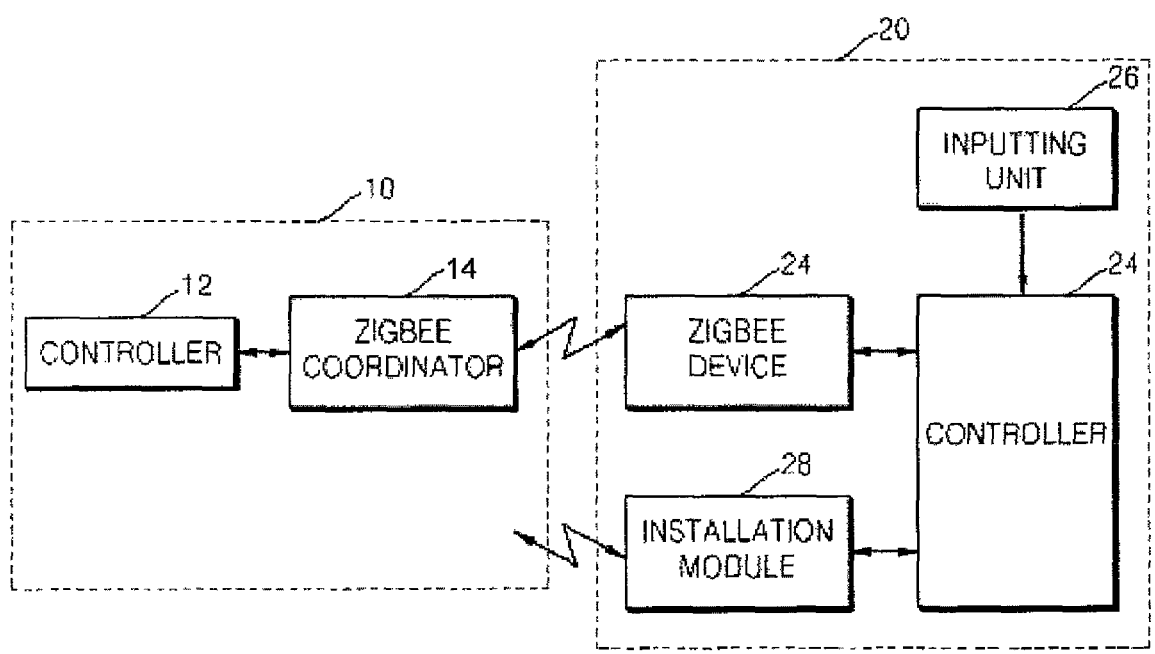
FIG. 1 illustrates a configuration of a system comprising a home appliance and a remote controller using a ZigBee communication network according to an exemplary embodiment of the present invention.

FIG. 1 illustrates a configuration of a system comprising a home appliance and a remote controller using a ZigBee communication network according to an exemplary embodiment of the present invention. Referring to FIG. 1, the system comprises a home appliance 10 (for example, any one of a plurality of interior devices in the case of an air conditioning system), and a remote controller 20, which transmits an operation instruction desired by a user, to the home appliance 10 using a ZigBee wireless communication network.

The home appliance 10 is a communication terminal comprising a controller 12 which controls all operations of the home appliance 10, and a ZigBee coordinator module which transmits and receives data, and coordinates the home appliance 10 and the remote controller 20.

If data is transmitted by the remote controller 20, the ZigBee coordinator 14 determines whether the transmitted data is in a ZigBee format. If the ZigBee coordinator 14 determines that the transmitted data is in a ZigBee format, the ZigBee coordinator 14 gets ready to form a network with the remote controller 20 by using a module for processing ZigBee format data. If the ZigBee coordinator 14 determines that the transmitted data is not in a ZigBee format based on the IEEE 802.15.4 standard, the ZigBee coordinator 14 gets ready to form a network with the remote controller 20 by transmitting data to another module for processing data in a format other than the ZigBee format.

The remote controller 20 is a communication terminal comprising a controller 22 which controls all operations of the remote controller 20, a ZigBee end device module 24 (hereinafter, referred to as a ZigBee device) which transmits and receives data with the home appliance 10 through ZigBee wireless communication, an inputting unit 26 which inputs installation signals for setting channels and PAN IDs of the ZigBee coordinator 14 performed at a physical/media access control (PHY/MAC) level of the IEEE 802.15.4 standard, and an installation module 28 which processes data having a different format from a ZigBee format when installation signals are input by the inputting unit 26 and comprise data having a non-ZigBee format according to the IEEE 802.15.4 standard.

Hereinafter, a communication system using ZigBee having the above structure and the operation and effect of a method of controlling the same will be described.

Figure 2A:
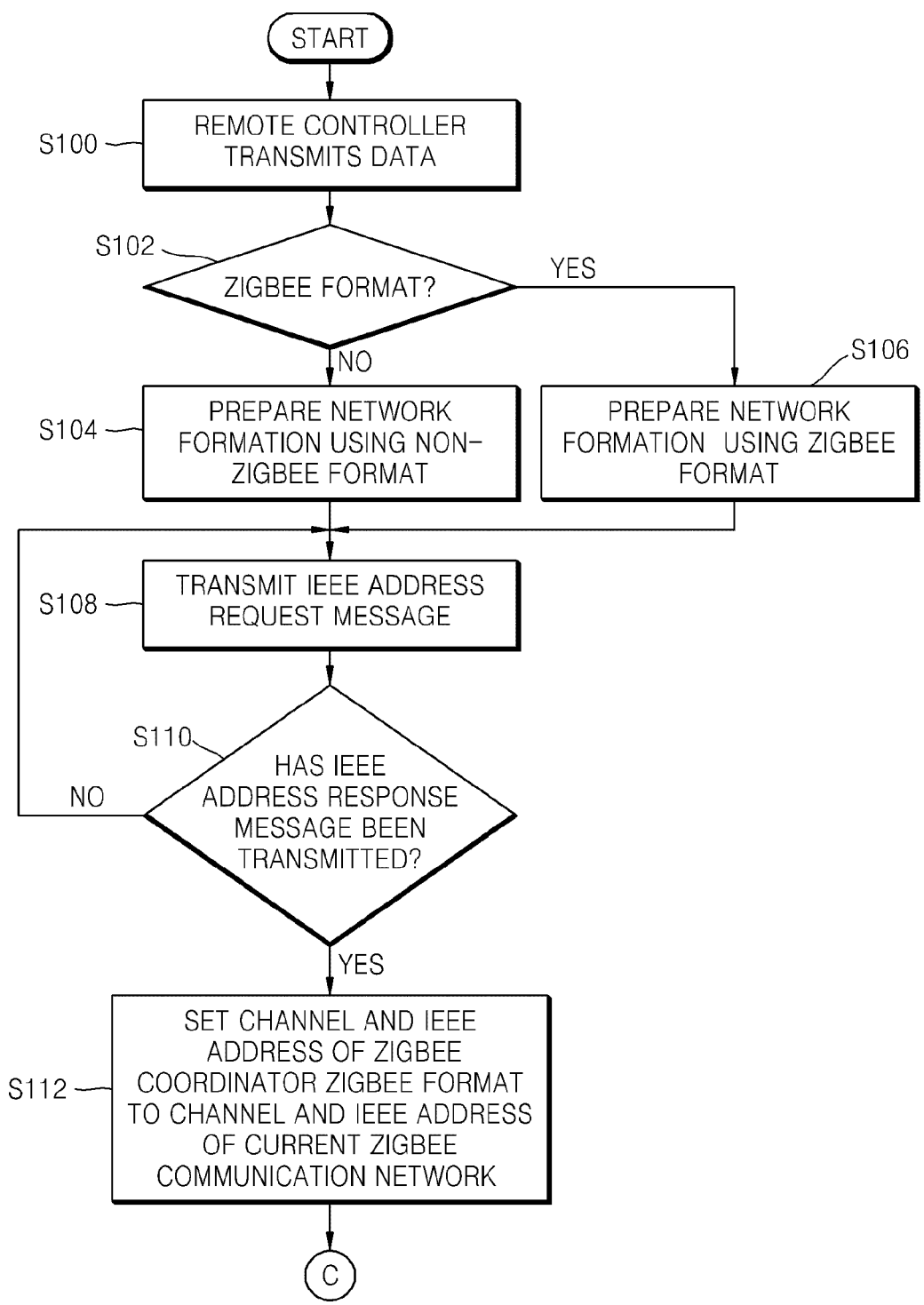
FIGS. 2A and 2B are flowcharts illustrating a control operation of setting channels and PAN IDs in a communication network using ZigBee according to an exemplary embodiment of the present invention.
Figure 2B:
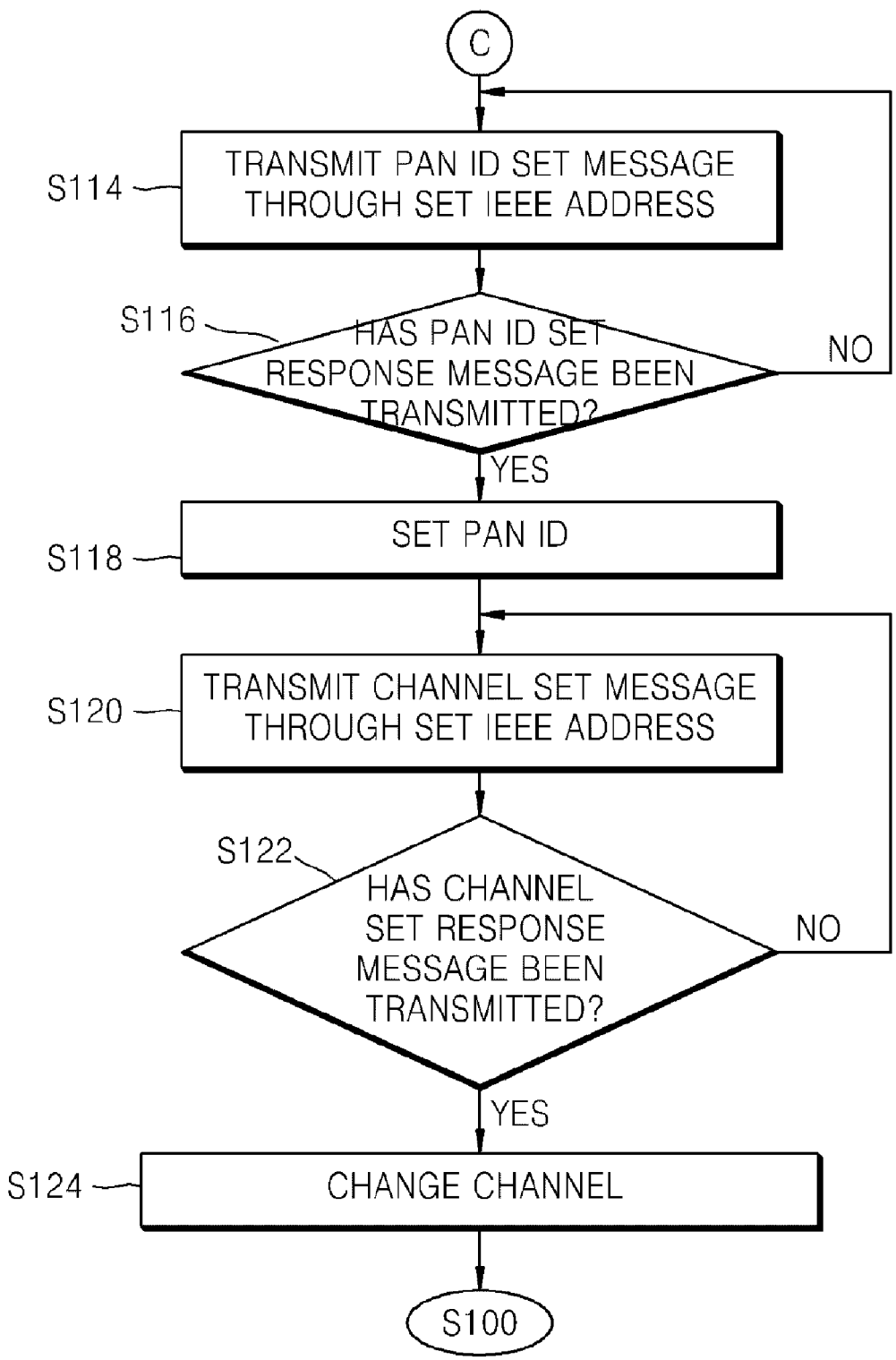

FIGS. 2A and 2B are flowcharts illustrating a control operation of setting channels and PAN IDs in a communication network using ZigBee according to an exemplary embodiment of the present invention.

Firstly, if data is transmitted by the remote controller 20 in response to a user's operation instruction (Operation S100), the ZigBee coordinator 14 of the home appliance 10 determines whether the transmitted data is in a ZigBee format (Operation S102). If the ZigBee coordinator 14 determines that the transmitted data is not in a ZigBee format based pm the IEEE 802.15.4 standard, the ZigBee coordinator 14 processes data having a format different from the ZigBee format and receives data related to network formation from the installation module 28 of the remote controller 20 in order to prepare network formation (Operation S104).

If the ZigBee coordinator 14 determines that the transmitted data is in the ZigBee format, formation of a ZigBee wireless communication network is prepared using a module which processes data having the ZigBee format (Operation S106).

As a result, the ZigBee coordinator 14 may form a network based on the IEEE 802.15.4 standard using data having a ZigBee format or a non-ZigBee format.

The ZigBee device 24 cannot determine an IEEE address or a channel of the ZigBee coordinator 14 and cannot perform communication and thus transmits an IEEE address request message in the ZigBee format or in the non-ZigBee format (Operation S108).

The ZigBee device 24 determines whether the ZigBee coordinator 14, which has received the IEEE address request message, has transmitted an IEEE address response message (Operation S110). If the ZigBee device 24 determines that an IEEE address response message has not been transmitted by the ZigBee coordinator 14, the ZigBee device 24 continuously transmits the IEEE address request message to the ZigBee coordinator 14 while changing the channel of the ZigBee coordinator 14.

If the ZigBee device 24 determines that the IEEE address response message has been transmitted by the ZigBee coordinator 14, the channel, i.e., the channel of the ZigBee coordinator 14, is set to a channel for a current communication network, and an IEEE address of the ZigBee coordinator 14 included in the IEEE address response message is set to an IEEE address. Thereafter, communication with the ZigBee coordinator 14 is possible by using the channel and the IEEE address (Operation S112).

In order to form a ZigBee communication network, a PAN ID as well as a channel is also required. Thus, the ZigBee coordinator 14 must set the PAN ID of the ZigBee device 24. To this end, the ZigBee device 24 transmits a PAN ID set message to the ZigBee coordinator 14 through the IEEE address (Operation S114).

The ZigBee coordinator 14 transmits a PAN ID set response message to the ZigBee device 24 according to the PAN ID set message after setting the PAN ID (Operation S116). The ZigBee device 24 receives the PAN ID set response message (Operation S116) and sets its own PAN ID according to the PAN ID included in the PAN ID set response message (Operation S118).

In addition, if a channel set message is transmitted to the ZigBee coordinator 14 through the IEEE address of the ZigBee coordinator 14 (Operation S120), the ZigBee coordinator 14 receives the channel set message, changes the channel, and transmits a channel set response message to the ZigBee device 24 (Operation S122). The ZigBee coordinator 14 transmits the channel set response message through a previous channel, and changes its own channel (Operation S124).

As described above, according to the communication system using ZigBee and the method of controlling the same according to the present invention, since channels and PAN IDs are set using only a remote controller when a ZigBee communication network is formed between a home appliance and the remote controller, redundant channels and PAN IDs can be prevented, and additional hardware or software is not needed to set or to change channels or PAN IDs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A communication system which forms a communication network between a plurality of communication terminals, the system comprising:
   a ZigBee coordinator which is disposed at a first communication terminal of the plurality of communication terminals, coordinates the plurality of communication terminals, and transmits and receives data; and
   a ZigBee device which is disposed at a second communication terminal of the plurality of communication terminals and forms a ZigBee communication network through communication with the ZigBee coordinator,
   wherein an inputting unit which sets channels and personal area network (PAN) identifications (IDs) of the ZigBee coordinator is provided at the second communication terminal, and
   wherein the ZigBee device transmits a channel and a PAN ID set message through a set IEEE address of the ZigBee coordinator.

2. The system of claim 1, wherein the first communication terminal is a home appliance.

3. The system of claim 1, wherein the second communication terminal is a remote controller.

4. The system of claim 3, wherein an installation module processing IEEE 802.15.4 data having a different format from a ZigBee format is provided at the second communication terminal.

5. The system of claim 1, wherein the ZigBee device transmits an IEEE address request message.

6. The system of claim 5, wherein the ZigBee device determines whether the ZigBee coordinator has transmitted an IEEE address response message.

7. The system of claim 6, wherein if the ZigBee device determines that the ZigBee coordinator has not transmitted the IEEE address response message, the ZigBee device continuously transmits the IEEE address request message while changing a channel of the ZigBee coordinator.

8. The system of claim 6, wherein if the ZigBee device determines that the ZigBee coordinator has transmitted the IEEE address response message, a channel of the ZigBee coordinator is set as the channel and the IEEE address of the ZigBee coordinator included in the IEEE address response message is set as the IEEE address.

9. The system of claim 1, wherein the ZigBee coordinator transmits a PAN ID set response message to the ZigBee device after setting the PAN ID.

10. The system of claim 9, wherein the ZigBee device receives the PAN ID set response message and set its own PAN ID according to the PAD ID included in the PAN ID set response message.

11. The system of claim 9, wherein the ZigBee coordinator transmits the channel set response message through a previous channel and changes its own channel.

12. The system of claim 1, wherein the ZigBee coordinator receives the channel set message, changes the channel and transmits a channel set response message to the ZigBee device.

13. A method of controlling a communication system which forms a communication network between a plurality of communication terminals, the method comprising:

requesting an IEEE address in a ZigBee format or in a format different from the ZigBee format through an installation module disposed at a first communication terminal of the plurality of communication terminals;

setting an IEEE address of a ZigBee coordinator disposed at a second communication terminal of the plurality of communication terminals in response to the IEEE address request;

transmitting a channel and personal area network (PAN) identification (ID) set message through the set IEEE address; and setting a channel and a PAN ID of a ZigBee device in response to the transmitted channel and PAN ID set message.

14. A non-transitory computer readable recording medium in which a program for executing the method of claim 13 is recorded.

15. The method of claim 14, wherein the ZigBee device receives the PAN ID set response message and set its own PAN ID according to the PAD ID included in the PAN ID set response message.

16. The method of claim 13, wherein the ZigBee coordinator transmits a PAN ID set response message to the ZigBee device after setting the PAN ID.

17. The method of claim 13, wherein the ZigBee coordinator receives the channel set message, changes the channel and transmits a channel set response message to the ZigBee device.

18. The method of claim 17, wherein the ZigBee coordinator transmits the channel set response message through a previous channel and changes its own channel.

* * * * *